US008431639B2

(12) United States Patent
Anchor

(10) Patent No.: US 8,431,639 B2
(45) Date of Patent: Apr. 30, 2013

(54) WETTING ADDITIVE AND COMPOSITION INCLUDING THE SAME

(75) Inventor: Michael J. Anchor, Canton, MI (US)

(73) Assignee: BASF Corporation, Florham Park, NJ (US)

( * ) Notice: Subject to any disclaimer, the term of this patent is extended or adjusted under 35 U.S.C. 154(b) by 863 days.

(21) Appl. No.: 11/937,076

(22) Filed: Nov. 8, 2007

(65) Prior Publication Data

US 2009/0124740 A1    May 14, 2009

(51) Int. Cl.
 *C08K 5/05* (2006.01)
 *C08K 5/06* (2006.01)

(52) U.S. Cl.
 USPC ....... 524/376; 106/287.26; 516/113; 568/606

(58) Field of Classification Search .................. 524/376; 106/287.26; 516/113; 568/606
 See application file for complete search history.

(56) References Cited

U.S. PATENT DOCUMENTS

| 3,567,784 A * | 3/1971 | Tsatsos et al. ................. 568/625 |
| 3,956,401 A * | 5/1976 | Scardera et al. .............. 568/625 |
| 3,983,088 A * | 9/1976 | Pozdneev et al. ............. 523/445 |
| 4,925,587 A | 5/1990 | Schenker et al. |
| 5,608,118 A * | 3/1997 | Dahlgren et al. ............. 568/625 |
| 5,612,305 A * | 3/1997 | Lewis ........................... 510/220 |
| 5,705,476 A * | 1/1998 | Hoffarth ....................... 510/535 |
| 5,767,056 A * | 6/1998 | Lenoir .......................... 510/423 |
| 5,780,555 A | 7/1998 | Corley et al. |
| 5,877,245 A | 3/1999 | Wiggins et al. |
| 6,194,513 B1 | 2/2001 | Sagiv |
| 6,362,259 B1 | 3/2002 | Natale et al. |
| 6,387,962 B1 | 5/2002 | Wiggins et al. |
| 6,489,382 B1 | 12/2002 | Giesecke et al. |
| 6,582,505 B1 | 6/2003 | Bouvy et al. |
| 6,583,185 B2 | 6/2003 | Wiggins et al. |
| 6,686,330 B2 | 2/2004 | Jordan, IV et al. |
| 7,160,397 B2 * | 1/2007 | Bergstrom ...................... 134/42 |
| 2003/0144397 A1 | 7/2003 | Bouvy et al. |
| 2004/0138075 A1 | 7/2004 | Brown et al. |
| 2004/0209983 A1 * | 10/2004 | Ruggiero et al. ............. 524/127 |
| 2006/0241230 A1 | 10/2006 | Porzio et al. |
| 2007/0243254 A1 | 10/2007 | Edgren et al. |
| 2008/0119600 A1 | 5/2008 | Anchor |
| 2008/0188603 A1 | 8/2008 | Porzio et al. |

FOREIGN PATENT DOCUMENTS

| DE | 10022371 A1 | 11/2000 |
| WO | WO94/11330 | 5/1994 |
| WO | WO 9820960 A1 | 5/1998 |
| WO | WO2004090005 A1 | 10/2004 |
| WO | WO 2007005470 A2 | 1/2007 |
| WO | WO2007025722 A2 | 3/2007 |
| WO | WO 2007112505 A1 | 10/2007 |
| WO | WO 2007141115 A2 | 12/2007 |
| WO | WO 2008003470 A1 | 1/2008 |
| WO | WO 2008048592 A2 | 4/2008 |

OTHER PUBLICATIONS

PCT International Search Report for PCT/US2008/012547 dated Feb. 4, 2009, 4 pages.
English language abstract for DE 10022371 extracted from espacenet.com database, dated Feb. 20, 2009.
English language abstract for WO 2007141115 extracted from espacenet.com database, dated Feb. 20, 2009.
English language abstract for WO 2008003470 extracted from espacenet.com database, dated Feb. 20, 2009.
Technical bulletin BASF "Surfactants and polyalkylene glycols", Jan. 2005, BASF Aktiengesellschaft Performance Chemicals for Detergents and Formulators, Germany.
Technical bulletin BASF "Lutensol XP(R) Surfactants", Sep. 2005, BASF Corporation, New Jersey.
Technical bulletin BASF "Lutensol(R) XL Surfactants", Sep. 2005, BASF Corporation, New Jersey.
Technical Bulletin BASF"Plurafac(R) S-405LF Low-Foaming Linear Alcohol Alkoxylate", 2002, BASF Corporation, New Jersey.
Technical Bulletin BASF "Plurafac(R) S-505LF Low-Foaming Linear Alcohol Alkoxylate", 2004, BASF Corporation, New Jersey.
English language abstract for WO 2007/025722.
Union Carbide Corporation, 1996, pp. 1-8.
Aspee et al., "Interfacial Free Energy of Alkanols in Aqueous Solutions: Dependence with Hydrophobicity and Topology of the Solute", Journal of Colloid and Interface Science, vol. 178, 1996, pp. 298-302.
Lockwood et al., "Influence of Surfactant Tail Branching and Organization on the Orientation of Liquid Crystals at Aqueous-Liquid Crystal Interfaces", Langmuir, vol. 21, 2005, pp. 6805-6814.
Marquez et al., "Partitioning of ethoxylated alkylphenol surfactants in microemulsion-oil-water systems. Part II: influence of hydrophobe branching", Colloids and Surfaces A: Physiochemical and Engineering Aspects, vol. 131, 1998, pp. 45-49.
O'Lenick, Jr. et al., "The Effect of Branching and Unsaturation upon Some Properties of Polyoxyethylene Glycol Diesters", Journal of Surfactants and Detergents, vol. 1, No. 4, Oct. 1998, pp. 529-532.
Rekvig et al., "Investigation of Surfactant Efficiency Using Dissipative Particle Dynamics", Langmuir, vol. 19, 2003, pp. 8195-8205.

* cited by examiner

*Primary Examiner* — Satya Sastri
(74) *Attorney, Agent, or Firm* — Howard & Howard Attorneys PLLC

(57) ABSTRACT

A composition, such as a pigment dispersion or coating composition, includes a pigment and a wetting additive. The wetting additive includes a first agent and a second agent. The first agent has the following formula:

$X(AO)_mH$ wherein X is a $C_6$ to $C_{16}$ branched chain, A is an alkylene group selected from the group of ethylene groups, propylene groups, butylene groups, and combinations thereof, and m is from about 3 to about 20. The second agent is different from the first agent and has the following formula:

$Y(A'O)_nH$ wherein Y is a $C_6$ to $C_{16}$ linear chain, A' is an alkylene group selected from the group of ethylene groups, propylene groups, butylene groups, and combinations thereof, and n is at least about 3. The second agent has a triblock $(A''O)_p(EO)_q(A''O)_r$ configuration in the portion represented by $(A'O)_n$, wherein A'' is selected from the group of propylene groups, butylene groups, and combinations thereof and wherein p, q, and r are each independently at least 1.

26 Claims, No Drawings

WETTING ADDITIVE AND COMPOSITION INCLUDING THE SAME

BACKGROUND OF THE INVENTION

1. Field of the Invention

The subject invention generally relates to a wetting additive and a coating composition including the wetting additive. More specifically, the subject invention relates to a wetting additive that is added to a coating composition to wet pigments for excellent color development, to wet the substrate for good coverage and reduced surface imperfections, and to add defoaming properties to the coating composition.

2. Description of the Prior Art

Coating compositions are well known in the art for use in various applications, especially in the construction industry for decorative and protective uses. The coating compositions are typically prepared by coloring or tinting a base composition at a point of purchase through addition of a pigment dispersion including organic and/or inorganic pigments. The base composition includes a polymeric base, such as acrylic latex, and may be water-borne or solvent-borne. Pigment dispersions are formulated for both water-borne and solvent-borne base compositions to be easily miscible and stable in the base composition.

A relative tint strength of the pigment dispersion, also known as color development, is one of the most important properties of the pigment dispersion. Tint strength is a function of a degree of dispersion of the pigment in the pigment dispersion and is a measure of color intensity. Specifically, more complete dispersion of the pigment within the pigment dispersion correlates to more intense color in the pigment dispersion and the resulting coating composition. As a result of more complete dispersion of the pigment, the pigment dispersion may be formulated with a lower pigment concentration to achieve desired tint strength as compared to pigment concentrations that are required when poorer dispersion of the pigment is achieved. Lower required pigment concentrations correlate to reduced cost of the pigment dispersion and resulting coating composition.

The pigment dispersions and/or coating compositions are formulated with additional additives in order to promote or hinder certain properties. For example, dispersing additives, also referred to as wetting additives, have been used as a key component to disperse the pigment in the coating composition and to provide acceptable color development. Conventional dispersing additives, such as allyl phenol ethoxylates (APEO), are used due to their effectiveness in wetting and dispersing particles and substrates. However, APEOs are under EPA regulatory scrutiny due to claimed aquatic toxicity and suspected estrogen-mimicking nature. Such concerns have led to a ban on the use of APEOs in coating compositions within the European Union and in parts of Canada. Therefore, many companies are re-formulating coating compositions or developing new coating compositions to eliminate the APEO dispersing additives. This is especially true for companies that export their coating compositions to countries where APEO is banned because most companies prefer to have one universal formulation that can be sold throughout the world rather than separate formulations for various parts of the world. However, APEOs are not easy to replace because of their effectiveness in wetting and dispersing properties. Further, the price of APEOs is low compared to other dispersing additives, and their cost-to-performance ratio is very attractive. While acetylenic diols have also been used in wetting and grind aid additives, there remains an opportunity to develop other wetting and grind aid additives that improve upon the performance of acetylenic diols.

Alcohol alkoxylates are one class of additives that are known for use in coating compositions. Alcohol alkoxylates cover a broad spectrum of additives that perform various functions, such as defoaming, wetting, dispersing, and acting as a surfactant. An example of one type of alcohol alkoxylate has the following formula:

$$X(AO)_nH$$

wherein X is selected from the group of linear carbon chains, branched carbon chains, aromatic rings, and combinations thereof, AO is an allyleneoxy group selected from the group of ethyleneoxy groups, 1,2-propyleneoxy groups, 1,2-butyleneoxy groups, and combinations thereof, and n is from to 1 to 75. Such alcohol alkoxylates, when included in the coating compositions, are present for any of the functions as described above.

U.S. Pat. No. 6,582,505 to Bouvy et al. is one specific reference that discloses the use of branched alcohol alkoxylates in coating compositions. In particular, Bouvy et al. teaches that the specific branched alcohol alkoxylates disclosed therein are suitable for replacing APEOs, and that the branched alcohol alkoxylates provide coating compositions with comparable properties to the APEOs. Bouvy et al. also discloses that other linear alcohol alkoxylates may be used in conjunction with the branched alcohol alkoxylates. While all ethylene oxide is typically used to alkoxylate branched or linear alcohols to make the alcohol alkoxylates of Bouvy et al., block and random copolymers of ethylene oxide and propylene oxide are also disclosed. However, there is no recognized benefit in Bouvy et al. through the use of the specific branched and linear alcohol alkoxylates taught therein and, as shown in Example 3, column 12 of Bouvy et al., worse color acceptance is achieved when branched and linear alcohol alkoxylates are used as compared to coating compositions including only branched alcohol alkoxylates.

Due to the strong demand to develop viable alternatives to replace APEOs in pigment dispersions and coating compositions without sacrificing physical properties, there is an opportunity to provide a wetting or dispersing additive, and a composition including the wetting or dispersing additive, that further improves upon the existing replacements for APEOs.

SUMMARY OF THE INVENTION AND ADVANTAGES

The subject invention provides a wetting additive and a composition including a pigment and the wetting additive. The wetting additive includes a first agent and a second agent. The first agent has the following formula:

$$X(AO)_mH$$

wherein X is a $C_6$ to $C_{16}$ branched chain, A is an alkylene group selected from the group of ethylene groups, propylene groups, butylene groups, and combinations thereof, and m is from about 3 to about 20. The second agent is different from the first agent and has the following formula:

$$Y(A'O)_nH$$

wherein Y is a $C_6$ to $C_{16}$ linear chain, A' is an alkylene group selected from the group of ethylene groups, propylene groups, butylene groups, and combinations thereof, and n is at least about 3. The second agent has a triblock $(A''O)_p(EO)_q(A''O)_r$ configuration in the portion represented by $(A'O)_n$, wherein A'' is selected from the group of propylene groups, butylene groups, and combinations thereof and wherein p, q, and r are each independently at least 1.

The wetting additive of the present invention may further improve upon the performance of existing replacements for alkyl phenol ethoxylates (APEO) and acetylenic diols in terms of at least dynamic surface tension, wetting, and antifoaming performance, which are all important physical properties for wetting additives. Additionally, the wetting additive of the present invention may be solvent free and 100% active, may have substantially no VOCs, and may enhance film properties by reducing water sensitivity, reducing surface imperfections to improve adhesion, and providing low foaming. Further, in some circumstances, the wetting additive of the present invention is even more effective than branched alcohol alkoxylates alone.

DETAILED DESCRIPTION OF THE INVENTION

A wetting additive and a composition including a pigment and the wetting additive are provided. The composition may be a pigment dispersion that that is used for coloring or tinting a coating composition at a point of purchase. Alternatively, the composition may be the coating composition including the pigment dispersion, and may be useful in interior and/or exterior architectural coating applications for decorative and/or protective purposes.

The wetting additive may be used to disperse the pigment in the pigment dispersion and/or in the coating composition. The wetting additive may also perform other functions within pigment dispersions and coating compositions, such as defoaming and/or wetting of substrates to reduce surface imperfections. The wetting additives are especially useful in water-based pigment dispersions and coating compositions, but may also be useful in solvent-based pigment dispersions and coating compositions. Water-based compositions have high surface tension values due to a high surface tension of water. The wetting additive of the present invention effectively lowers surface tension in the water-based compositions to achieve excellent wetting of both pigments and substrates.

The wetting additive includes a first agent and a second agent. The first agent has the following formula:

$$X(AO)_mH$$

wherein X is a $C_6$ to $C_{16}$ branched chain, A is an alkylene group selected from the group of ethylene groups, propylene groups, butylene groups, and combinations thereof, and m is from about 3 to about 20. Preferably, X is a $C_9$ to $C_{14}$ group and m is from about 3 to about 14. However, the exact degree of alkoxylation, represented by m, is dependent upon a hydrophobicity of X, with higher hydrophobicity of X typically correlating to greater degrees of alkoxylation. Most preferably, X is about 10. Because X is a branched chain, the first agent may be referred to as a branched alcohol alkoxylate. Preferably, A is an ethylene group or a combination of ethylene and propylene groups. Most preferably, A is all ethylene groups. The first agent typically has a number average molecular weight of from about 250 to about 4000 g/mol, more typically from about 250 to about 1750 g/mol, most typically from about 250 to about 400 g/mol. One specific example of a suitable first agent is a $C_{10}$-Guerbet alcohol-based alcohol alkoxylate that is formed by the reaction of $C_{10}$-Guerbet alcohol with about 5 moles of ethylene oxide for each mole of the $C_{10}$-Guerbet alcohol and has a number average molecular weight of about 370 g/mol. Another specific example of a suitable first agent is a $C_{10}$-Guerbet alcohol with about 1 mole of propylene oxide and about 5 moles of ethylene oxide for each mole of the $C_{10}$-Guerbet alcohol and has a number average molecular weight of about 651 g/mol.

The first agent can be formed in accordance with techniques that are known in the art, such as through the addition of alkylene oxide to a branched monohydric alcohol having from about 6 to about 14 carbon atoms. Representative branched monohydric alcohols include, but are not limited to, Guerbet alcohols. Such alcohols may be provided as mixtures of primarily branched-chain molecules. A particularly preferred branched monohydric alcohol is 2-propyl heptanol, which typically provides better wetting and dynamic properties as compared to other alcohols.

The second agent is different from the first agent and has the following formula:

$$Y(A'O)_nH$$

wherein Y is a $C_6$ to $C_{16}$ linear chain, A' is an alkylene group selected from the group of ethylene groups, propylene groups, butylene groups, and combinations thereof, and n is at least about 3, typically from about 3 to about 30. Typically, Y is either a $C_6$ to $C_{10}$ linear chain or a $C_{12}$ to $C_{16}$ linear chain. In addition, from about 40 to about 70 mol % of all A' groups are typically ethylene groups, and from about 20 to about 50% of all A' groups are typically propylene or butylene groups. The second agent has a triblock $(A''O)_p(EO)_q(A''O)_r$ configuration in the portion represented by $(A'O)_n$. In the triblock $(A''O)_p(EO)_q(A''O)_r$ configuration, A'' is selected from the group of propylene groups, butylene groups, and combinations thereof, and EO represents ethylene oxide. Further, p, q, and r are each independently at least 1. Stated differently, each A''O or EO enclosed by parentheses represents a block, with at least one A''O or EO group present in the respective blocks. Typically, a value of p+q+r is from about 3 to about 30. Without being bound to any particular theory, it is believed that the triblock configuration contributes to enhanced wetting characteristics and lower pour point of the second agent, as compared to diblock configurations. It is also believed that the triblock configuration contributes to a low foaming nature of the second agent, which is an important feature for wetting additives. Typically, the second agent has the following general formula:

$$Y(A''O)_p(EO)_q(A''O)_rH$$

wherein p, q, and r are each independently at least 1, and wherein the total of p+q+r is from about 3 to about 30. A ratio of q to p+r (q:p+r) in the second agent is typically from about 1:1 to about 3:1. It is to be appreciated that a perfect $(A''O)_p(EO)_q(A''O)_r$ configuration is not specifically required, with some random copolymerization still resulting in an acceptable second agent. In one embodiment, at least one A'' group in the second agent is a butylene group. More specifically, while the second agent may include more than one PO (propylene oxide) block, such as a $(PO)_p(EO)_q(PO)_r$ configuration, the second agent may alternatively include at least one BO (butylene oxide) block, such as a $(BO)_p(EO)_q(PO)_r$ configuration or a $(BO)_p(EO)_q(BO)_r$ configuration. Alternatively, the second agent may have primarily a $(PO)_p(EO)_q(PO)_r$ configuration, but with a BO group included in one of the PO blocks. Examples of suitable second agents, for purposes of the present invention, are alcohol alkoxylates based on a $C_{6-10}$ alcohol having a triblock $(PO)_p(EO)_q(PO)_r$ configuration, wherein p, q, and r are each independently at least 1, p+q+r is from about 3 to about 30, and a ratio of q:p+r is about 1:1, alternatively about 3:1.

While additional components may be included in the wetting additive, the wetting additive typically includes only the first agent and the second agent. The first agent and the second agent are typically present in the wetting additive in a weight ratio of from about 1:9 to about 9:1. More typically, the first agent and the second agent are typically present in the wetting additive in a weight ratio of about 1:1. The first agent is typically present in the wetting additive in an amount of from about 10 to about 90 parts by weight, more typically in an amount of about 50 parts by weight, based on 100 parts by weight of the wetting additive. Likewise, the second agent is typically present in the wetting additive in an amount of from about 10 to about 90 parts by weight, more typically in an amount of about 50 parts by weight, based on 100 parts by weight of the wetting additive.

The wetting additive exhibits excellent pigment wetting, which results in excellent color development, and also effectively controls foaming and is also an effective substrate wetting additive. The wetting additive performs as well as conventional wetting additives, and in some cases out-performs the conventional wetting additives without presenting potential health and/or environmental concerns that are attendant with the conventional wetting additives. Further, the wetting additives are typically 100% active and are typically compatible with most additives that may be used in coating compositions.

Numerous measurements are employed to predict and measure wetting properties of the wetting additive. The measurements are performed on solutions comprising 0.2 wt. % of the wetting additive in water, with water forming the balance of the solution. Measurements of surface tension, both static and dynamic, are one of the measurements that are commonly used. As known in the art, static surface tension is measured when the wetting additive is at rest and is measured with a DuNoy ring. Dynamic surface tension is measured when the wetting additive is not at rest, when new surfaces are being rapidly formed. Static and dynamic surface tension are measured with a bubble tensiometer, with the static surface tension measurement being a tensiometer reading at 1 bubble/second. Typically, the wetting additive of the present invention has a static surface tension of from about 29 to about 31 dynes/cm at a bubble rate of 1 bubble/second and a dynamic surface tension measurements of from about 31 to about 33 dynes/cm at a bubble rate of 3 bubbles/second, from about 36 to about 38 dynes/cm at a bubble rate of 6 bubbles/second, and from about 37 to about 39 dynes/cm at a bubble rate of 10 bubble/second.

Additionally, interfacial tension interaction between the wetting additive and a solid surface is another measurement that is commonly used to predict and measure wetting properties of wetting additive. The interfacial tension interaction is measured by determining a wetting angle (contact angle) of droplets of the wetting additive applied to a solid surface. Various surfaces are used in the tests, including glass, cold-rolled steel, and polystyrene. Wetting is at its optimum when a cosine of the wetting angle approaches 1 and the droplet is spread over the solid surface. The contact angle is measured with a pocket goniometer, model number PG-3, commercially available from Thwing-Albert Instrument Company. Time, starting at the point when the droplet is applied to the solid surface, is a factor for the contact angle measurement. On glass, the wetting additives of the present invention have a contact angle from about 15° to about 40° at 0 seconds and from about 5° to about 20° at 100 seconds. On cold-rolled steel, the wetting additives of the present invention have a contact angle from about 55° to about 75° at 0 seconds and from about 25° to about 45° at 100 seconds. On polystyrene, the wetting additives of the present invention have a contact angle from about 55° to about 750 at 0 seconds and from about 30° to about 45° at 100 seconds.

As set forth above, the composition of the present invention includes the wetting additive and the pigment. As also set forth above, in one embodiment, the composition of the present invention may be the pigment dispersion, i.e., a color concentrate, that is used for coloring or tinting the coating composition. In this embodiment, the composition includes the pigment, the wetting additive, and may include other components that are known in the art for including in pigment dispersions.

A wide range of pigments may be included in the composition. Suitable pigments include inorganic pigments such as titanium dioxide, pigmentary iron oxide ($Fe_2O_3$) and organic pigments including blue pigments such as Heliogen® blue L 6920, L 6875, and L 6870 from BASF, Monastral® blue FGX from Zeneca, and phthalocyanine blue from Minerva; green pigments such as Monastral® green GNX-C from Zeneca and Heliogen® green L 8735 from BASF; yellow pigments such as Sico® FR 1252 arylide yellow from BASF and Hansa® Bright yellow 2GX70 from Hoechst; red pigments such as Sico® Echtrot L 3855 from BASF, Paliogen® L 4790 quinacridone red from BASF and Novoperm® red 3RK70 from Hoechst; violet pigments such as Paliogen® 5890 dioazine violet from BASF and Monolite® violet RN from Zeneca; orange pigments such as Novoperm® orange HL70 from Hoechst; and similar materials.

The amount of wetting additive included in the composition, when the composition is the pigment dispersion, is typically from about 0.02 to about 50 parts by weight, more typically from about 2 to about 20 parts by weight, based on 100 parts by weight of the pigment. The amount of the wetting additive included in the composition typically depends upon the specific pigment that is used. For inorganic pigments, such as titanium dioxide and iron oxide pigment, lesser amounts of the wetting additive are typically required as compared to when organic pigments are used. The amount of pigment included in the composition, when the compositions is the pigment dispersion, is typically less than or equal to about 20 parts by weight based on 100 parts by weight of the composition.

In another embodiment, the composition of the present invention is the coating composition. The coating composition, in addition to the pigment and the wetting additive, includes a polymeric base that may be either solvent-borne or water-borne. For example, the polymeric base is typically a water-based latex component, and the coating composition may be referred to as "latex-based" paint. The latex component is typically in the form of discrete solid polymeric particles formed by the polymerization of at least one ethylenically-unsaturated monomer in an aqueous dispersion medium. The polymeric particles are typically formed by emulsion polymerization in accordance with known technology.

Representative polymeric particles that are suitable for the composition include styrene-butadiene polymers, acrylic polymers, vinyl acetate polymers, vinyl chloride polymers, and combinations thereof. Suitable styrene-butadiene polymeric particles include those composed of from about 40 to about 70 parts by weight, more typically from about 45 to about 65 parts by weight, based on 100 parts by weight of the polymeric particles. The styrene-butadiene polymeric particles may be formed from carboxylated styrene-butadiene polymers. Suitable acrylic polymers include copolymers of acrylonitrile, acrylic acid, methacrylic acid, butylacrylic acid, styrene, and combinations thereof. The polymeric particles typically have a number average particle size of from about 0.05 to about 3 microns, and preferably a number average particle size of about 0.1 to about 0.5 micron. However, it is to be appreciated that solid polymeric particles that are outside of the above ranges may also be suitable for purposes of the present invention.

The particular wetting additive that is included in the coating composition may be optimized based upon the polymeric base that is included in the coating composition. For example, when the polymeric base includes vinyl acetate polymers, the wetting additive typically comprises the $C_{10}$-Guerbet alcohol-based alcohol alkoxylate that is formed by the reaction of the $C_{10}$-Guerbet alcohol with about 5 moles of ethylene oxide for each mole of the $C_{10}$-Guerbet alcohol as the first agent, and the alcohol alkoxylate based on a $C_{6-10}$ alcohol having a triblock $(PO)_p(EO)_q(PO)_r$ configuration, wherein p, q, and r are each independently at least 1, p+q+r is from about 3 to about 30, and a ratio of q:p+r is about 1:1 as the second agent. In this embodiment, the first agent is typically present in an amount of about 40 parts by weight and the second agent is typically present in an amount of about 60 parts by weight, based on 100 parts by weight of the wetting additive. Alternatively, when the polymeric base includes a combination of vinyl acetate polymers and acrylic polymers, the wetting additive typically comprises the $C_{10}$-Guerbet alcohol-based alcohol alkoxylate that is formed by the reaction of the $C_{10}$-Guerbet alcohol with about 1 mole of propylene oxide and then about 5 moles of ethylene oxide for each mole of the $C_{10}$-Guerbet alcohol as the first agent and the alcohol alkoxylate based on a $C_{6-10}$ alcohol having a triblock $(PO)_p(EO)_q(PO)_r$ configuration, wherein p, q, and r are each independently at least 1, p+q+r is from about 3 to about 30, and a ratio of q:p+r is about 3:1 as the second agent. In this embodiment, the first agent is typically present in an amount of about 40 parts by weight and the second agent is typically present in an amount of about 60 parts by weight, based on 100 parts by weight of the wetting additive.

In addition to the polymeric base, the wetting additive, and the pigment, the coating composition may further include an additive selected from the group of dispersing agents, defoaming agents, adhesion promoters, viscosity modifiers, additives to improve hiding, additives to improve blocking, neutralizing agents, biocides, fillers, and combinations thereof. It is to be appreciated that the additives set forth above may also be included in the composition of the present invention when the composition is the pigment dispersion.

When the composition of the present invention is the coating composition, the polymeric base is typically present in an amount of from about 30 to about 65 parts by weight, more typically from about 45 to about 55 parts by weight, based on 100 parts by weight of the coating composition. The wetting additive is typically present in an amount of from about 0.1 to about 20 parts by weight, more typically from about 0.3 to about 1.0 parts by weight based on 100 parts by weight of the coating composition. The pigment is typically present in an amount of less than or equal to about 20 parts by weight, more typically from about 2.0 to about 5.0 parts by weight, based on 100 parts by weight of the coating composition.

The coating composition typically has a low volatile organic compound (VOC) content of less than or equal to about 150 g/L, typically less than or equal to about 50 g/l, which meets or exceeds standards for VOC content in interior and exterior flat and non-flat paints for all sheen ranges while providing equivalent or superior properties to those provided by volatile coalescing solvents. VOCs, as defined herein, are organic chemical compounds that have high enough vapour pressures under normal conditions to significantly vaporize and enter the atmosphere and that are characterized as such by the United States Environmental Protection Agency through testing in accordance with EPA Method 24.

The coating composition of the present invention exhibits excellent physical properties including excellent foaming properties and color development, as evaluated by color change, comparison of relative color strength, rub-out performance, gloss, and foam performance as compared to industry standard acetylenic diol-based high-performance wetting additives and grind aid additives. Specific details of the physical properties are described in further detail in the Examples below.

The following examples are meant to illustrate the present invention and are not to be viewed in any way as limiting to the scope of the present invention.

EXAMPLES

Various examples of coating compositions are formulated using different wetting additives. The coating composition is formulated by first preparing the wetting additive. To prepare the wetting additive, the first agent, second agent, and optional components are mixed. The order of addition is unimportant. Once mixed, the wetting additive is heated to a temperature of about 40° C. and stirred for about 30 minutes. Specific first agents, second agents, and optional components that are used to formulate the wetting additive, as well as amounts of each of those components, are shown below in Table 1. All amounts are in parts by weight based on 100 parts by weight of the wetting additive unless indicated otherwise.

TABLE 1

| Agent | Wetting Additive A | Wetting Additive B | Comp. Wetting Additive A | Comp. Wetting Additive B | Comp. Wetting Additive C |
|---|---|---|---|---|---|
| First Agent A | 50.0 | 0.0 | 0.0 | 0.0 | 100.0 |
| First Agent B | 0.0 | 50.0 | 0.0 | 0.0 | 0.0 |
| Second Agent A | 50.0 | 0.0 | 0.0 | 0.0 | 0.0 |
| Second Agent B | 0.0 | 50.0 | 0.0 | 0.0 | 0.0 |
| Acetylenic Diol A | 0.0 | 0.0 | 50.0 | 0.0 | 0.0 |
| Acetylenic Diol B | 0.0 | 0.0 | 0.0 | 100.0 | 0.0 |
| Ethylene Glycol | 0.0 | 0.0 | 50.0 | 0.0 | 0.0 |
| Total | 100.0 | 100.0 | 100.0 | 100.0 | 100.0 |

First Agent A is an ethylene oxide adduct of 2-propyl heptanol with about 5 moles of ethylene oxide, commercially available from BASF Corporation of Florham Park, N.J.

First Agent B is an ethylene oxide and propylene oxide adduct of 2-propyl heptanol with about 1 mole of propylene oxide and about 5 moles of ethylene oxide, commercially available from BASF Corporation of Florham Park, N.J.

Second Agent A is a fatty alcohol alkoxylate of a $C_{6-10}$ alcohol having a triblock $(PO)_p(EO)_q(PO)_r$ configuration, wherein p, q, and r are each independently at least 1, wherein p+q+r is from about 3 to about 30, and wherein a ratio of q:p+r is about 1:1, commercially available from BASF Corporation of Florham Park, N.J.

Second Agent B is a fatty alcohol alkoxylate of a $C_{6-10}$ alcohol having a triblock $(PO)_p(EO)_q(PO)_r$ configuration, wherein p, q, and r are each independently at least 1, wherein p+q+r is from about 3 to about 30, and wherein a ratio of q:p+r is about 3:1, commercially available from BASF Corporation of Florham Park, N.J.

Acetylenic Diol A is Surfynol® 104, commercially available from Air Products and Chemicals, Inc. of Allen Town, Pa.

Acetylenic Diol B is Surfynol® CT 111, commercially available from Air Products and Chemicals, Inc.

Compositions are prepared including the wetting additives of the present invention, and comparative compositions are prepared including the comparative wetting additives that outside of the scope of the present invention. The compositions are formulated with an equal weight replacement of the comparative wetting additives with wetting additives of the present invention based upon activity of the comparative wetting additive to be compared. For example, if the wetting additive of the present invention is compared to a comparative wetting additive that is 50% active, and the charge for the comparative wetting additive is 10 grams, the wetting additive of the present invention would be charged at one-half of the charge for the comparative wetting additive because the wetting additives of the present invention are typically 100% active.

The compositions are prepared by first preparing a pigment dispersion. The pigment dispersion is prepared by grinding a mixture of a pigment, the wetting additive, and other components in the presence of glass beads, on a LUA DAS 200 Disperser, setting 2 for a period of from 20 to 30 minutes to Hegman 6 or greater. Relative amounts of each component included in the pigment dispersions are set forth in Table 2. All amounts are in parts by weight, based on 100 parts by weight of the pigment dispersion.

TABLE 2

| Component | Pigment Dispersion A | Pigment Dispersion B | Comp. Pigment Disp. A | Comp. Pigment Disp. B | Comp. Pigment Disp. C | Comp. Pigment Disp. D |
|---|---|---|---|---|---|---|
| Wetting Additive A | 0.67 | 0.00 | 0.00 | 0.00 | 0.00 | 0.00 |
| Wetting Additive B | 0.00 | 0.67 | 0.00 | 0.00 | 0.00 | 0.00 |
| Comparative Wetting Additive A | 0.00 | 0.00 | 0.67 | 0.00 | 0.00 | 1.34 |
| Comparative Wetting Additive B | 0.00 | 0.00 | 0.00 | 0.67 | 0.00 | 0.00 |
| Comparative Wetting Additive C | 0.00 | 0.00 | 0.00 | 0.00 | 0.67 | 0.00 |
| Water | 15.50 | 15.50 | 15.50 | 15.50 | 15.50 | 15.40 |
| Ethylene Glycol | 7.41 | 7.41 | 7.41 | 7.41 | 7.41 | 7.36 |
| Viscosity Modifier | 0.18 | 0.18 | 0.18 | 0.18 | 0.18 | 0.18 |
| Dispersing Agent A | 3.10 | 3.10 | 3.10 | 3.10 | 3.10 | 3.08 |
| Dispersing Agent B | 0.45 | 0.45 | 0.45 | 0.45 | 0.45 | 0.45 |
| Defoaming Agent | 0.45 | 0.45 | 0.45 | 0.45 | 0.45 | 0.45 |
| Biocide A | 0.34 | 0.34 | 0.34 | 0.34 | 0.34 | 0.33 |
| Pigment | 55.27 | 55.27 | 55.27 | 55.27 | 55.27 | 54.90 |
| Filler A | 16.63 | 16.63 | 16.63 | 16.63 | 16.63 | 16.51 |
| Total | 100.00 | 100.00 | 100.00 | 100.0 | 100.00 | 100.00 |

Viscosity Modifier is Natrosol® 250 HBR commercially available from Hercules, Inc.

Dispersing Agent A is Tamol® 1254 commercially available from Rohm and Haas Coatings.

Dispersing Agent B is AMPS® 95 commercially available from The Dow Chemical Company.

Defoaming Agent is Dehydran® 1620 commercially available from Cognis Polymers, Coatings, & Inks.

Biocide A is Proxel® DL commercially available from Arch Chemicals, Inc.

Pigment A is Kronos® 2310 commercially available from Fitz Chem. Corporation.

Filler A is Minex® 7 commercially available from Unimin Corporation.

Coating compositions are prepared including the pigment dispersions set forth above in Table 3. Relative amounts of each component included in the coating composition are set forth in Table 4. The coating composition is prepared by mixing or shaking the components set forth in Table 4 at a low speed setting for about 20 minutes until the composition is uniform. All amounts are in parts by weight, based on 100 parts by weight of the coating composition.

TABLE 4

| Component | Ex. 1 | Ex. 2 | Comp. Ex. 1 | Comp. Ex. 2 | Comp. Ex. 3 | Comp. Ex. 4 |
|---|---|---|---|---|---|---|
| Pigment Dispersion A | 40.54 | 0.00 | 0.00 | 0.00 | 0.00 | 0.00 |
| Pigment Dispersion B | 0.00 | 40.54 | 0.00 | 0.00 | 0.00 | 0.00 |
| Comparative Pigment Dispersion A | 0.00 | 0.00 | 40.54 | 0.00 | 0.00 | 0.00 |
| Comparative Pigment Dispersion B | 0.00 | 0.00 | 0.00 | 40.54 | 0.00 | 0.00 |
| Comparative Pigment Dispersion C | 0.00 | 0.00 | 0.00 | 0.00 | 40.54 | 0.00 |
| Comparative Pigment Dispersion D | 0.00 | 0.00 | 0.00 | 0.00 | 0.00 | 40.7 |
| Water | 10.66 | 10.66 | 10.66 | 10.66 | 10.66 | 10.63 |
| Defoaming Agent | 0.18 | 0.18 | 0.18 | 0.18 | 0.18 | 0.18 |
| Polymeric Base | 35.88 | 35.88 | 35.88 | 35.88 | 35.88 | 35.79 |
| Filler B | 9.20 | 9.20 | 9.20 | 9.20 | 9.20 | 9.17 |
| Coalescing Solvent | 1.46 | 1.46 | 1.46 | 1.46 | 1.46 | 1.45 |
| Rheology Modifier A | 1.37 | 1.37 | 1.37 | 1.37 | 1.37 | 1.36 |
| Rheology Modifier B | 0.18 | 0.18 | 0.18 | 0.18 | 0.18 | 0.18 |
| Biocide B | 0.54 | 0.54 | 0.54 | 0.54 | 0.54 | 0.54 |
| Total | 100.01 | 100.01 | 100.01 | 100.01 | 100.01 | 100.00 |

Polymeric Base A is Acronal Optive® 110 acrylic resin commercially available from BASF Corporation.

Filler B is Rhopaque® Polymer OP 96 commercially available from Rohm and Haas Coatings.

Coalescing Solvent is Texanol® commercially available from Eastman-Kodak Company.

Rheology Modifier A is Aquaflow® NHS 300 commercially available from Hercules, Inc.

Rheology Modifier B is Aquaflow® NLS 200 commercially available from Hercules, Inc.

Biocide B is Nopcocide® N 40 D commercially available from Cognis Polymers, Coatings, & Inks.

Physical properties of the coating compositions are tested and compared to illustrate the effectiveness of the wetting additives of the present invention. Physical properties of the coating composition that are tested include DE* value (color change), CREL % (color strength), gloss, rub-out performance, and foam testing.

DE* value defines a total color difference, as measured on the CIELAB color scale using a spectrophotometer, between a film formed from a tested coating composition and a film formed from a standard coating composition. The lower the number, the closer the color is to the control. CREL % is a measurement of developed color of film formed from a coating composition and is obtained through a computer program that calculates CREL % based upon readings from the spectrophotometer. A developed color of a film formed from a standard coating composition is set at 100% CREL, and all films formed from tested coating compositions are compared to the standard coating composition. CREL % numbers that are higher than 100% are darker and have more developed color than the film formed from the standard coating composition. Numbers less than 100% are lighter in developed color than the film formed from the standard coating composition and have less developed color than the film formed from the standard coating composition. To measure rub-out performance, one zone of a film is rubbed and a DE* value is compared to that of an unrubbed zone of the film. Testing procedures for rub-out performance are known in the art. Values closest to zero represent excellent rub-out performance, while positive values represent a level of instability of titanium dioxide pigment in the coating composition, and negative values represent a level of instability of other pigments in the coating composition. Gloss is measured at 20° and 60°, with a BYK Gardner handheld Micro-TRI-Gloss meter. The foam test is performed by dabbing a 6 mil freshly drawn down sample of the coating composition with a paint brush with 15 strokes, letting the sample dry into a film, and counting a number of bubbles per 1.5 square inches. Higher bubble counts correlate to poorer foam performance.

To test for DE* value, CREL %, and gloss, a standard is necessary. In a first set of experiments, Comparative Example 1 is chosen as the standard. Results for the various tests, using Comparative Example 1 as the standard, are set forth below in Table 5.

TABLE 5

| Example | DE* Value | CREL % | K-DE | Rub-Out | Gloss, 20° | Gloss, 60° | Foam Test |
|---|---|---|---|---|---|---|---|
| Ex. 1 | 0.55 | 104.2 | 0.04 | 0.12 | 0.4 | 5.9 | 51 |
| Ex. 2 | 0.96 | 107.9 | 0.29 | 0.25 | 0.5 | 6.9 | 53 |
| Comp. Ex. 1 | 0.00 | 100.0 | 0.00 | 0.32 | 0.4 | 4.6 | 49 |
| Comp. Ex. 3 | 0.72 | 105.2 | 0.14 | 0.14 | 0.5 | 6.5 | 44 |
| Comp. Ex. 4 | — | 103.5 | — | — | — | — | 58 |

Notably, because the acetylenic diol A in Comparative Wetting Additive A (Comp. Wetting Additive A) is diluted with ethylene glycol, as a solvent, on a 1:1 weight basis because acetylenic diol is not water soluble. Therefore, Comparative Example 4 (Comp. Ex. 4) represents a double charge of the acetylenic diol A to provide a comparable amount (on a % weight basis) of acetylenic diol A to the amounts of the wetting additives present in Examples 1 and 2 (Ex. 1 and Ex. 2).

In a second set of experiments, Comparative Example 2 is chosen as the standard. Results for the various tests, using Comparative Example 2 as the standard, are set forth below in Table 6. Gloss and Foam Test results are excluded as these results are not standardized to a control.

TABLE 6

| Component | DE* Value | CREL % | K-DE | Rub-Out |
|---|---|---|---|---|
| Example 1 | 0.12 | 100.3 | 0.04 | 0.09 |
| Example 2 | 0.47 | 103.8 | 0.29 | 0.28 |
| Comparative Example 1 | 0.51 | 96.3 | 0.01 | 0.22 |
| Comparative Example 2 | 0.00 | 100.0 | 0.00 | 0.00 |
| Comparative Example 3 | 0.24 | 101.2 | 0.14 | 0.13 |
| Comparative Example 4 | 0.16 | 100.2 | — | — |

Obviously, many modifications and variations of the present invention are possible in light of the above teachings, and the invention may be practiced otherwise than as specifically described within the scope of the appended claims.

What is claimed is:

1. A wetting additive comprising:
a first agent having the following formula:

$$X(AO)_mH$$

wherein
X is a $C_6$ to $C_{16}$ branched chain,
A is an alkylene group selected from the group of ethylene groups, propylene groups, butylene groups, and combinations thereof, and
m is from about 3 to about 20; and
a second agent having the following formula:

$$Y(A'O)_nH$$

wherein
Y is a $C_6$ to $C_{16}$ linear chain,
A' is an alkylene group selected from the group of ethylene groups, propylene groups, butylene groups, and combinations thereof, and
n is at least about 3;
said second agent having a triblock $(A''O)_p(EO)_q(A''O)_r$ configuration in said portion represented by $(A'O)_n$, wherein A'' is selected from the group of propylene groups, butylene groups, and combinations thereof and wherein p, q, and r are each independently at least 1.

2. A wetting additive as set forth in claim 1 wherein X is a $C_9$ to $C_{14}$ group.

3. A wetting additive as set forth in claim 2 wherein m is from about 3 to about 14.

4. A wetting additive as set forth in claim 1 wherein from about 40 to about 70 mol % of all A' groups are ethylene groups.

5. A wetting additive as set forth in claim 1 wherein said second agent has the following formula:

$$Y(A''O)_p(EO)_q(A''O)_rH$$

wherein p+q+r is from about 3 to about 30.

6. A wetting additive as set forth in claim 5 wherein at least one A'' group is a butylene group.

7. A wetting additive as set forth in claim 1 wherein said first agent and said second agent are present in a weight ratio of from about 1:9 to about 9:1.

8. A wetting additive as set forth in claim 1 wherein said first agent is present in said wetting additive in an amount of from about 40 to about 60 parts by weight based on 100 parts by weight of said wetting additive.

9. A wetting additive as set forth in claim 1 wherein said second agent is present in said wetting additive in an amount of from about 10 to about 90 parts by weight based on 100 parts by weight of said wetting additive.

10. A composition comprising:
(I) a pigment; and
(II) a wetting additive comprising:
(A) a first agent having the following formula:

$$X(AO)_mH$$

wherein
X is a $C_6$ to $C_{16}$ branched chain,
A is an alkylene group selected from the group of ethylene groups, 1,2-propylene groups, 1,2-butylene groups, and combinations thereof, and
m is from about 3 to about 20; and
(B) a second agent having the following formula:

$$Y(A'O)_nH$$

wherein
Y is a $C_6$ to $C_{16}$ linear chain,
A' is an alkylene group selected from the group of ethylene groups, propylene groups, butylene groups, and combinations thereof, and
n is at least about 3;
said second agent having a triblock $(A''O)_p(EO)_q(A''O)_r$ configuration in said portion represented by $(A'O)_n$, wherein A'' is selected from the group of propylene groups, butylene groups, and combinations thereof and wherein p, q, and r are each independently at least 1.

11. A composition as set forth in claim 10 wherein X is a $C_9$ to $C_{14}$ group.

12. A composition as set forth in claim 11 wherein m is from about 3 to about 14.

13. A composition as set forth in claim 10 wherein from about 40 to about 70 mol % of all A' groups are ethylene groups.

14. A composition as set forth in claim 10 wherein said second agent has the following formula:

$$Y(A''O)_p(EO)_q(A''O)_rH$$

wherein p+q+r is from about 3 to about 30.

15. A composition as set forth in claim 14 wherein at least one A'' group is a butylene group.

16. A composition as set forth in claim 10 wherein said first agent and said second agent are present in a weight ratio of from about 1:9 to about 9:1.

17. A composition as set forth in claim 10 further defined as a pigment dispersion.

18. A composition as set forth in claim 17 wherein said wetting additive is present in said composition in an amount of from about 0.02 to about 50 parts by weight based on 100 parts by weight of said pigment.

19. A composition as set forth in claim 18 wherein said pigment is present in said composition in an amount from less than or equal to about 20 parts by weight based on 100 parts by weight of said composition.

20. A composition as set forth in claim 10 further defined as a coating composition.

21. A composition as set forth in claim 20 further comprising a polymeric base.

22. A composition as set forth in claim 21 wherein said polymeric base is present in an amount of from about 30 to about 65 parts by weight based on 100 parts by weight of said composition.

23. A composition as set forth in claim 22 wherein said wetting additive is present in an amount of from about 0.1 to about 20 parts by weight based on 100 parts by weight of said composition.

24. A composition as set forth in claim 23 wherein said pigment is present in an amount of less than or equal to about 20 parts by weight based on 100 parts by weight of said composition.

25. A composition as set forth in claim 21 having volatile organic components present in an amount of less than about 50 g/l.

26. A wetting additive as set forth in claim 1 wherein said first agent is formed from a Guerbet alcohol.

* * * * *